(12) United States Patent
Wilson

(10) Patent No.: US 8,236,149 B2
(45) Date of Patent: Aug. 7, 2012

(54) ELECTROLYSIS TYPE ELECTROLYZER FOR PRODUCTION OF HYDROGEN AND OXYGEN FOR THE ENHANCEMENT OF IGNITION IN A HYDROCARBON FUEL AND/OR GAS COMBUSTION DEVICE

(76) Inventor: David M. Wilson, Rocky Mount, VA (US)

( * ) Notice: Subject to any disclaimer, the term of this patent is extended or adjusted under 35 U.S.C. 154(b) by 873 days.

(21) Appl. No.: 12/317,671

(22) Filed: Dec. 26, 2008

(65) Prior Publication Data

US 2010/0163407 A1    Jul. 1, 2010

(51) Int. Cl.
*C25B 9/00*    (2006.01)
*C25B 1/02*    (2006.01)
*C25B 1/04*    (2006.01)
*C25B 11/04*   (2006.01)

(52) U.S. Cl. ........ 204/272; 205/628; 205/630; 205/631; 205/632

(58) Field of Classification Search .................. 204/272; 105/628–632; 205/628–632
See application file for complete search history.

(56) References Cited

U.S. PATENT DOCUMENTS

| | | | | |
|---|---|---|---|---|
| 3,813,223 A | * | 5/1974 | Fleck | 422/550 |
| 4,599,158 A | * | 7/1986 | Ofenloch | 204/229.5 |
| 4,675,085 A | * | 6/1987 | Vasquez | 205/337 |
| 5,089,098 A | * | 2/1992 | Tacchi | 204/176 |
| 5,105,773 A | * | 4/1992 | Cunningham et al. | 123/3 |
| 5,250,177 A | * | 10/1993 | Cho | 210/192 |
| 6,103,076 A | * | 8/2000 | Mizuno | 204/286.1 |
| 6,790,324 B2 | * | 9/2004 | Chambers | 204/242 |
| 6,866,756 B2 | * | 3/2005 | Klein | 204/268 |
| 6,890,410 B2 | * | 5/2005 | Sullivan | 204/258 |
| 2002/0179453 A1 | * | 12/2002 | Chambers | 205/628 |
| 2004/0045836 A1 | * | 3/2004 | Tseng | 205/620 |
| 2005/0217991 A1 | * | 10/2005 | Dahlquist, Jr. | 204/267 |
| 2007/0084728 A1 | * | 4/2007 | Martez | 204/627 |

* cited by examiner

*Primary Examiner* — Jonathan Johnson
*Assistant Examiner* — Ciel Thomas

(57) ABSTRACT

A multi-cell or single-cell electrolysis type electrolyzer for the production of hydrogen gas and oxygen gas with a delivery system through tubes, bubbler and check valve to internal combustion engine, generator, turbine or similar combustion device for the enhancement of hydrocarbon fuels and/or gas combustion device is disclosed. This device comprises at least one or more chambers of sealed containers, distilled water, a variety of electrolytes, multi or single strand stainless steel, nickel or platinum wire, a plastic, glass, or ceramic insulator within a stainless steel, nickel, or platinum tube and an ultrasonic piezo crystal allowing water and or a weak electrolyte solution to decompose into hydrogen gas and oxygen gas.

25 Claims, 2 Drawing Sheets

ELECTROLYSIS TYPE ELECTROLYZER FOR PRODUCTION OF HYDROGEN AND OXYGEN FOR THE ENHANCEMENT OF IGNITION IN A HYDROCARBON FUEL AND/OR GAS COMBUSTION DEVICE

FIELD OF THE INVENTION

This invention addresses the need to improve ignition performance in internal combustion engines. More specifically an electrolysis type electrolyzer for production of hydrogen and oxygen gas device with a delivery system through tubes, bubbler and check valve to an internal combustion engine, turbine or similar combustion device for the enhancement of hydrocarbon fuel and/or gas combustion is disclosed.

BACKGROUND OF THE INVENTION

With today's ever increasing need to save fossil fuels from being consumed at such alarming rates, there is a need for energy alternative devices to reduce such large consumption for the entire world. The generation of both hydrogen gas and oxygen gas when mixed with hydrocarbon fuels can reduce overall consumption of fossil fuels when introduced into the internal combustion engine, turbine, gas generator or similar combustion device and deliver better performance. The introduction of an electrolysis type electrolyzer of this type can even reduce the future need for fossil fuels entirely.

BRIEF SUMMARY OF THE INVENTION

A multi-cell or single-cell electrolysis type electrolyzer for production of hydrogen and oxygen gas device with delivery system through tubes, bubbler and check valve to internal combustion engine, turbine or similar combustion device for the enhancement of hydrocarbon fuel and/or gas combustion is disclosed. This device comprises at least one or more chambers of sealed containers, distilled water, a variety of electrolytes, multi or single strand stainless steel, nickel or platinum wire, a plastic, glass, or ceramic insulator within a stainless steel, nickel, or platinum tube attached to an ultrasonic piezo crystal allowing water and electrolyte to decompose into hydrogen and oxygen gas.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
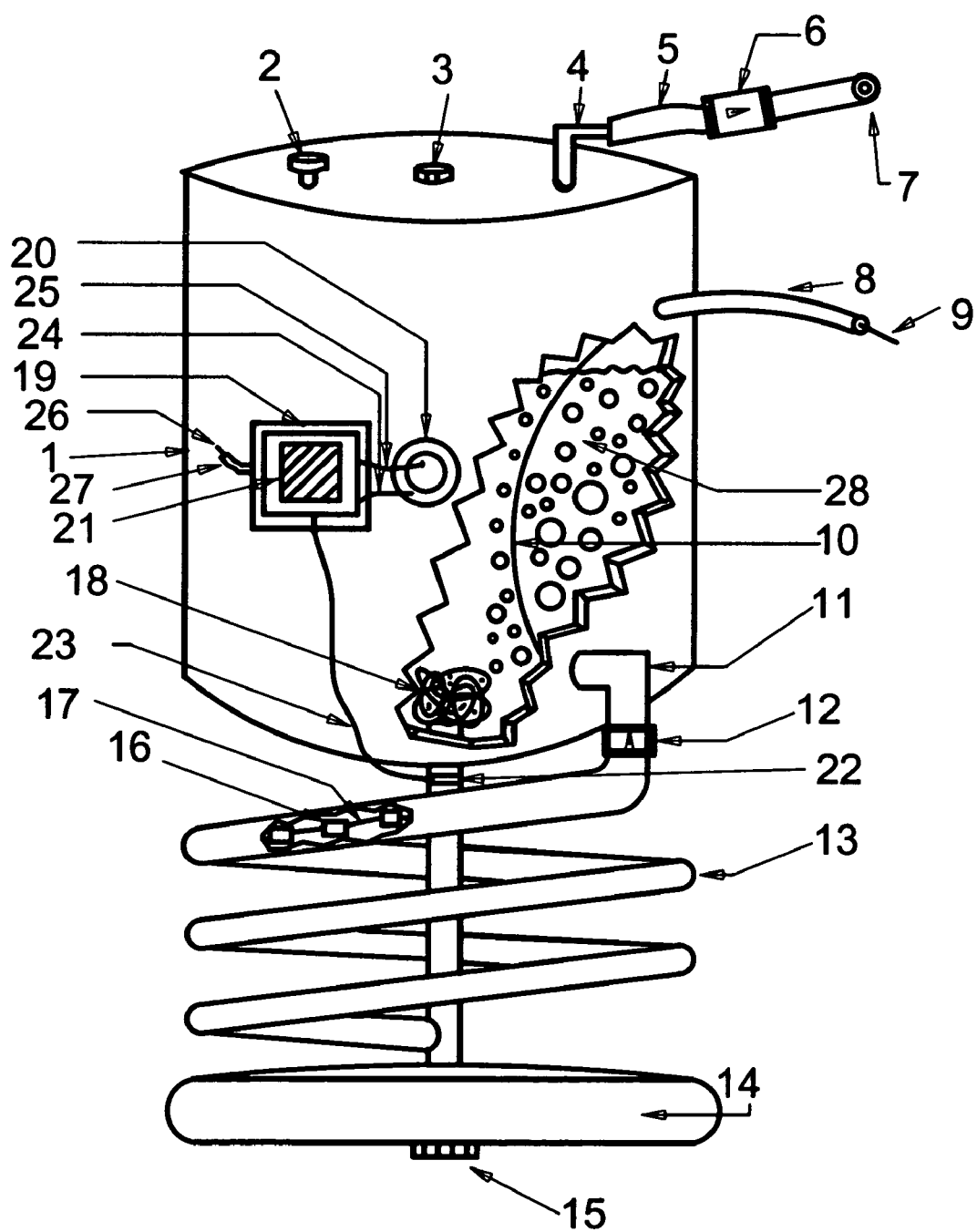
FIG. 1 is a perspective drawing of one example of a single-cell electrolysis type electrolyzer; and, FIG. 2 is a perspective drawing of one example of a bubbler.

Referring now to the drawings FIG. 1 shows a stainless steel or composite plastic container or reservoir (1) which holds and supplies the distilled water mixed with a variety of electrolytes (i.e.: potassium hydroxide approximately 3-4%) forming a weaker electrolytic solution (28) to enter the positively charged (i.e.: 12-15 volts direct current or 6-16 volts positive square wave form at variable oscillations and/or positive triangle wave form) at variable oscillations to supply the spiral platinum, nickel or stainless steel tube (13) in order to cause an electrolytic reaction within the spiral platinum, nickel or stainless steel tube (13) with the platinum, nickel or stainless steel negative conductor (9 and 10). This electrolytic reaction ultimately causes decomposition of the water molecules along with the potassium hydroxide to form separate atoms of hydrogen and oxygen that forms hydroxy gas that simply escapes through the top of the spiral platinum, nickel or stainless steel tube (13) into the stainless or composite plastic container or reservoir (1) and through the weaker electrolytic solution (28), through the stainless steel or nylon plastic threaded or welded 90 degree pipe to hose fitting (4), through the plastic or rubber output hose (5) and one way check valve (6) as well as the plastic or rubber output hose (7) to provide the hydroxy gas to an internal combustion engine, turbine or similar combustion device for the enhancement in hydrocarbon fuel and/or gas combustion device. Attached to the stainless steel or composite plastic container or reservoir (1) is a pressure relief valve (2), a threaded plastic or stainless steel fill cap (3), a nylon plastic threaded or stainless steel welded 90 degree pipe to hose fitting (4) attached to a plastic or rubber output hose or tube (5) and an one way flow valve (6) connected to the plastic or rubber output hose (7).

FIG. 1 also shows a plastic or rubber ground or negative wire insulation jacket (8), the platinum, nickel or stainless steel negative conductor (9 and 10) enters the stainless steel or composite plastic container or reservoir (1) through the threaded nylon or welded stainless steel 90 degree fitting (11) attached to the optional one way valve (12) in which the opposite side of the one way valve (12) is attached to the spiral platinum, nickel or stainless steel tube (13) in which is contained the platinum, nickel or stainless steel wire (16) that is partially and intermittently jacketed or covered with ceramic spacers, perforated heat shrink tubing or heat resistant plastic sleeve (17) in order to electrically insulate the platinum, nickel or stainless steel conductor (9 and 10) from the inner wall of the spiral platinum, nickel or stainless steel tube (13) in order to maintain the ability for the electrolytic process to occur.

Further FIG. 1 also discloses the contaminate and debris collecting container (14) with a drain or clean out metal, nylon or plastic threaded cap (15) in order to collect foreign materials and unused electrolytic waste (i.e.: potassium from the KOH).

FIG. 1 also shows a nylon, plastic, spun fibrous platinum, nickel or stainless steel filter (18) attached to platinum, nickel, stainless steel spiral tube (13) welded or clamped through an opening at the bottom of the stainless steel or composite plastic container or reservoir (1) in order to decrease or hinder contaminates or debris from entering the spiral platinum, nickel or stainless steel tube.

FIG. 1 also shows the voltage sensing and high frequency output oscillator control board and module (19). The voltage sensing portion of this module senses the output charge voltage from an alternator or generator from approximately 14.1 VDC to 15.1 VDC to connect the positive plastic or rubber insulated conductor wire (23) electrically connected to stainless steel hose clamp (22) in order to provide positive electrical charges to the spiral platinum, nickel or stainless steel tube (13), voltage sensing and high frequency output oscillator control board, and module plastic insulated cover (21). The high frequency output oscillator portion of the control board and module provides a continuous or pulsating 42 KHz output oscillation to the ultrasonic piezo crystal (20) in order to vibrate the water molecules and the spiral platinum, nickel or stainless steel tube (13) as well as the stainless steel composite plastic container or reservoir (1) so that the oxygen atoms and hydrogen atoms rapidly shake off the surfaces of the inner wall of the spiral platinum, nickel or stainless steel tube (13) and the outer surface of the platinum, nickel or stainless steel conductor (9 and 10) in order to allow the gases (hydrogen gas and oxygen gas) to be rapidly replaced with more water and electrolytic solution to then be decomposed on the newly exposed surfaces of the inner wall of the spiral platinum, nickel or stainless steel tube (13) and the outer surface of the platinum, nickel or stainless steel conductor (9 and 10).

FIG. 1 also a shows the ultrasonic piezo crystal (20) glued to the stainless steel or composite plastic container or reservoir (1) in order to vibrate the stainless steel or composite plastic container for reservoir (1), to vibrate the spiral platinum, nickel or stainless steel tube (13), to vibrate the platinum, nickel or stainless steel conductor (9 and 10) and vibrate the water molecules and electrolytic solution to agitate hydrogen gas and oxygen gas off the inner surface of the spiral platinum, nickel or stainless steel tube (13) and the surface of the platinum, nickel or stainless conductor (9 and 10) in order to allow water molecules to replace the gaseous formations (hydrogen gas and oxygen gas) generated by the electrolytic action so as to accelerate the ability of this device to decompose water. Attached is the optional ultrasonic piezo crystal (20) is a plastic insulated signal wire (25) and a plastic insulated return signal wire (24) to supply an oscillating signal power to the ultrasonic piezo crystal (20) at approximately 42 KHz in order to transfer these vibrations to the device. Both the plastic insulated signal wire (25) and the plastic insulated signal wire (24) are connected to the voltage sensing and high frequency oscillator control board and module (19).

FIG. 1 also shows the positive copper wire input conductor (26) jacketed with rubber or plastic insulation (27) connected to the voltage sensing and high frequency output oscillator control board and module (19).

FIG. 1 also shows the distilled water and possibility contaminated water mixed with a variety of electrolytes forming a weaker electrolytic solution (28) in order to continuously supply the weaker electrolytic solution (28) to the inside of the spiral platinum, nickel or stainless steel tube (13) to allow electrolysis to occur.

Figure 2:
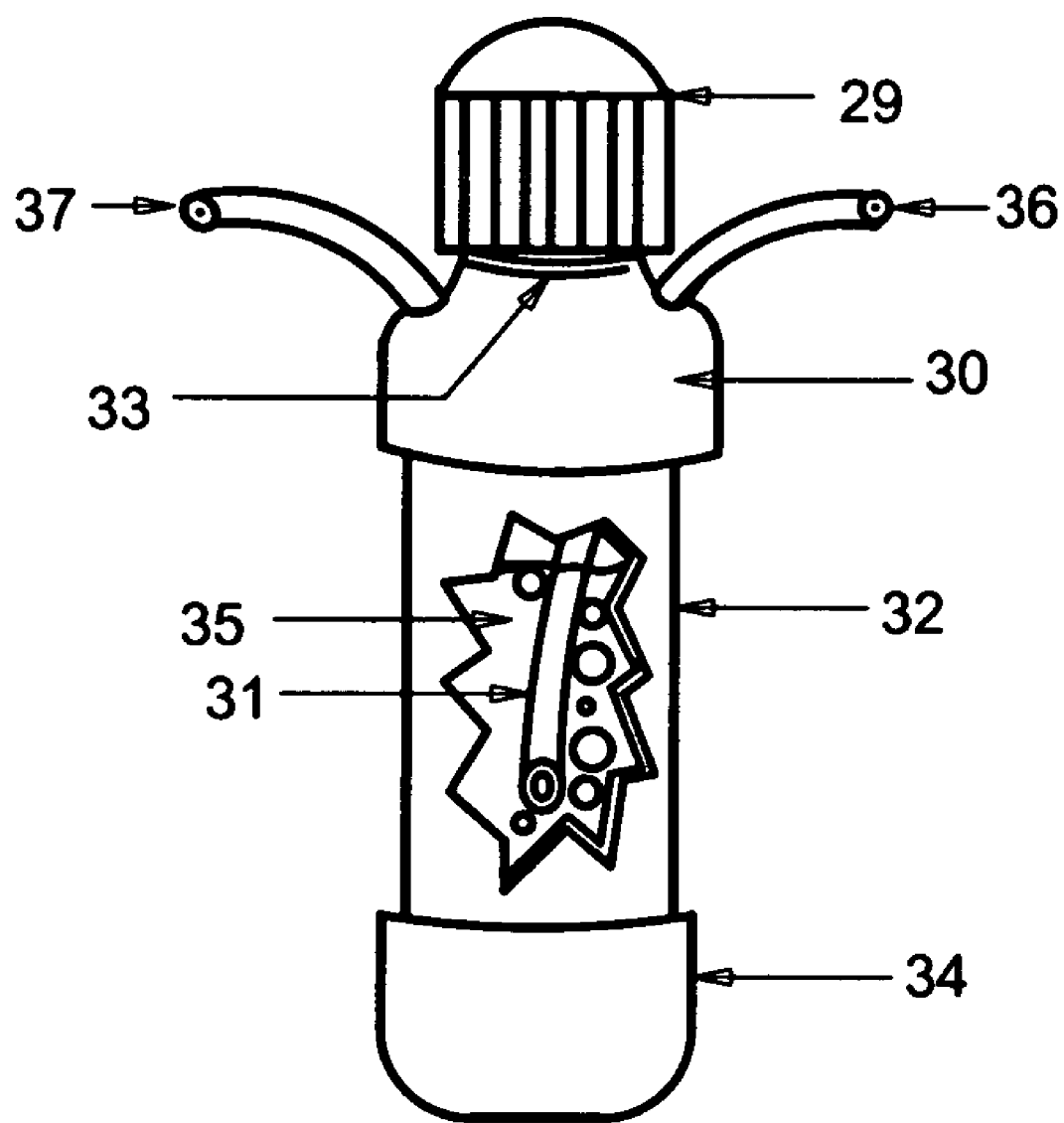

Referring now to FIG. 2 what is shown is a removable bubbler fill cap (29) in order to maintain a proper level of the ordinary or distilled water (35) or to clean the bubbler apparatus. A plastic, rubber or stainless steel input tube (36) along with the plastic, rubber or stainless steel output tube (37) connected through drill holes through threaded adaptor to pipe fitting (30) glued to plastic tube (32) with end cap (34) in order to hold the ordinary or distilled water (35). The purpose of the bubbler is to allow the flow of hydroxy gas to bubble from nearly the bottom of the bubbler apparatus through the tapered cut plastic, rubber or stainless input tube section (31) to allow the hydroxy gas to be cleaned from possible contaminants (impurities) and moisture leaving only hydrogen gas and oxygen gas to exit after passing through the ordinary or distilled water (35) out through the top of the plastic, rubber or stainless steel output tube (37) so that clean hydroxy gas can be burned in an internal combustion engine, turbine or similar combustion device for the enhancement in hydrocarbon fuel and/or gas combustion devices without moisture or contaminates to be entered in an internal combustion engine, turbine or similar combustion device.

FIG. 2 is also shows the internal section of a tapered cut plastic, rubber or stainless steel input tube section (31) submerged in ordinary or distilled water (35).

FIG. 2 also shows the pipe threads (33) cut into threaded adaptor pipe fitting (30) for service or refilling of the ordinary or distilled water (35).

In operation the device produces hydrogen and oxygen by use of the voltage sensing and high frequency output oscillator control board and module (19), voltage sensing and high frequency output oscillator control board and module plastic insulated cover (21), a positive plastic or rubber insulated conductor (23) electrically connected to stainless steel hose clamp (22) in order to provide positive electrical charges to the spiral platinum, nickel or stainless steel tube (13) and to provide a continuous or pulsating 42 KHz output oscillation to the ultrasonic piezo crystal (20) in order to vibrate the water molecules and the spiral platinum, nickel or stainless steel tube (13) as well as the stainless steel or composite plastic container or reservoir (1) so that the oxygen atoms and hydrogen atoms rapidly shake off the surfaces of the inner wall of the spiral platinum, nickel or stainless steel tube (13) and the outer surface of the platinum, nickel or stainless steel conductor (9 and 10) in order to allow the gases (hydrogen gas and oxygen gas) to be rapidly replaced with more water and electrolytic solution to then be decomposed on that newly exposed surfaces of the inner wall of the spiral platinum, nickel or stainless steel tube (13) and the outer surface of the platinum, nickel or stainless steel conductor (9 and 10) in order to repeatedly decompose water through an electrolytic solution into oxygen gas and hydrogen gas.

Since certain changes may be made in the above described device for producing hydrogen and oxygen used to boost ignition of internal combustion engines without departing from the scope of the invention herein involved, it is intended that all matter contained in the description thereof or shown in the accompanying figures shall be interpreted as illustrative and not in a limiting sense.

What is claimed is:

1. An electrolysis type electrolyzer device for production of hydrogen gas and oxygen gas for the enhancement of hydrocarbon fuel or gas combustion comprising:

a. a reservoir filled with electrolyte and water to a level such that a gas reservoir space is located above a surface of the electrolyte and the water;
    b. a fill cap fitted to the reservoir for filling the reservoir with the water and/or the electrolyte to said level;
    c. an output hose connected to the reservoir for outputting the hydrogen and the oxygen gases to a combustion device;
    d. a first electrode, wherein the first electrode is formed of a platinum, nickel or stainless steel spiral tube;
    e. a second electrode, wherein the second electrode is formed of a platinum, nickel or stainless steel conductor located within an inside of the spiral tube;
    f. wherein the conductor is a single or multiple strand wire;
    g. wherein the water and the electrolyte are supplied to the inside of the spiral tube via a vertical pipe section wherein the vertical pipe section is connected from a bottom of the reservoir to a bottom end of the spiral tube;
    h. wherein electric potential is applied between the spiral tube and the conductor so that the hydrogen and the oxygen gases are generated from the water within the spiral tube on an inner surface of the spiral tube and an outer surface of the conductor;
    i. wherein a top end of the spiral tube is connected to a lower end of the reservoir so that the hydrogen and the oxygen gases generated within the spiral tube rise through the reservoir;
    j. wherein after the hydrogen and the oxygen gases rise through the reservoir the hydrogen and the oxygen gases rise to the gas reservoir space and out the output hose;

k. wherein the electric potential is provided via voltage from an alternator or generator;
l. a voltage sensing and high frequency output oscillator control board and module connected to the alternator or the generator;
m. wherein the voltage sensing and high frequency output oscillator control board and module senses a voltage from the alternator or the generator to provide an electrical charge to the spiral tube via an insulated conductor wire connected to a hose clamp;
n. an ultrasonic piezo crystal provided with a continuous or pulsating output oscillation from the voltage sensing and high frequency output oscillator control board and module for vibrating the water, the spiral tube, the conductor and the reservoir so that the oxygen and the hydrogen gases formed on the inner surface of the spiral tube and the outer surface of the conductor are rapidly shaken off from the inner surface of the spiral tube and the outer surface of the conductor and rapidly replaced with the water and the electrolyte for decomposition; and
o. wherein the inner surface of the spiral tube and the outer surface of the conductor are not connected to each other and the exterior of the spiral tube is not immersed in the water or the electrolyte in the reservoir.

2. The electrolysis type electrolyzer device of claim 1, further comprising a bubbler apparatus for receiving the hydrogen and the oxygen from the reservoir prior to the hydrogen and the oxygen gases being received by the combustion device, the bubbler apparatus comprising:
a. a tube with an end cap on a lower end of the tube, a bubbler pipe fitting on an upper end of the tube and a removable bubbler fill cap threaded to the bubbler pipe fitting;
b. wherein the bubbler apparatus is filled with water through the removable bubbler fill cap;
c. wherein the hydrogen and the oxygen gases enter the bubbler apparatus from the reservoir near the lower end of the tube through a bubbler input hose fitted through the bubbler pipe fitting via a first drill hole so that the hydrogen and the oxygen gases rise through the water so that contaminants, impurities and moisture are removed from the hydrogen and the oxygen gases;
d. wherein the hydrogen and the oxygen gases exit the bubbler apparatus after rising through the water through a bubbler output hose fitted through the bubbler pipe fitting via a second drill hole so that the hydrogen and the oxygen gases can be received by the combustion device.

3. The electrolysis type electrolyzer device of claim 2, wherein the bubbler pipe fitting is glued to the upper end of the tube.

4. The electrolysis type electrolyzer device of claim 2, wherein the water in the bubbler apparatus is selected from the group consisting of normal water or distilled water.

5. The electrolysis type electrolyzer device of claim 2, wherein the tube is formed of plastic and the bubbler input hose and the bubbler output hose are formed of plastic, rubber or stainless steel.

6. The electrolysis type electrolyzer device of claim 2, wherein an input section of the bubbler input hose is tapered.

7. The electrolysis type electrolyzer device of claim 1, further comprising a contaminate and debris collecting container connected to the vertical pipe at an end located downstream from where the vertical pipe is connected to the lower end of the spiral tube with a drain cap for collecting and cleaning out foreign materials and waste.

8. The electrolysis type electrolyzer device of claim 7, wherein the drain cap is removable, threaded and formed of stainless steel, nylon or plastic.

9. The electrolysis type electrolyzer device of claim 1, wherein the electrical potential is supplied such that the spiral tube is a cathode.

10. The electrolysis type electrolyzer device of claim 1, wherein the conductor is partially and intermittently covered in order to electrically insulate the conductor from the inner surface of the spiral tube wherein the covering is formed of ceramic spacers, perforated heat shrink tubing, or a heat resistant plastic sleeve.

11. The electrolysis type electrolyzer device of claim 1, further comprising a pressure relief valve connected to the reservoir.

12. The electrolysis type electrolyzer device of claim 1, wherein the water comprises distilled water and the electrolyte comprises potassium hydroxide.

13. The electrolysis type electrolyzer device of claim 1, wherein the voltage is supplied from 12-15 volt direct current, a 6-16 volt positive square wave form at variable oscillations or a 6-16 volt positive triangle wave form at variable oscillations.

14. The electrolysis type electrolyzer device of claim 1, further comprising a one way valve attached to the spiral tube.

15. The electrolysis type electrolyzer device of claim 1, wherein the reservoir is formed of stainless steel or composite plastic.

16. The electrolysis type electrolyzer device of claim 1, wherein the fill cap is removable, threaded and formed of stainless steel or plastic.

17. The electrolysis type electrolyzer device of claim 1, wherein the output hose is fitted to the reservoir via a pipe to hose fitting, comprises a one way check valve and is formed of plastic or rubber.

18. The electrolysis type electrolyzer device of claim 17, wherein the pipe to hose fitting is a 90 degree pipe to hose fitting and is formed of threaded nylon plastic or welded stainless steel.

19. The electrolysis type electrolyzer device of claim 1, wherein the insulated portion of the insulated conductor wire is formed of rubber or plastic.

20. The electrolysis type electrolyzer device of claim 1, wherein the hose is formed of stainless steel.

21. The electrolysis type electrolyzer device of claim 1, wherein the combustion device is selected from the group consisting of a combustion engine, an engine, a turbine or a gas generator.

22. The electrolysis type electrolyzer device of claim 1, wherein the voltage sensing and high frequency output oscillator control board and module is contained within a plastic insulated cover.

23. The electrolysis type electrolyzer device of claim 1, further comprising a resettable circuit breaker connected between the voltage sensing and high frequency output oscillator control board and module and the insulated conductor wire.

24. The electrolysis type electrolyzer device of claim 1, wherein the output oscillation is at 42 KHz.

25. The electrolysis type electrolyzer device of claim 1, wherein a nylon, plastic, spun fibrous platinum, nickel or stainless steel filter is attached to the vertical pipe section at the bottom of the reservoir to prevent contaminates and/or debris from entering the spiral tube.

* * * * *